United States Patent [19]

Knechtel et al.

[11] 4,318,609
[45] Mar. 9, 1982

[54] DUAL MODE COPYING APPARATUS FOR COPYING THICK AND SHEET ORIGINALS

[75] Inventors: Wilhelm Knechtel, Biebertal; Friedel Stillger, Wetzlar, both of Fed. Rep. of Germany

[73] Assignee: Canon Kabushiki Kaisha, Tokyo, Japan

[21] Appl. No.: 64,905

[22] Filed: Aug. 8, 1979

Related U.S. Application Data

[63] Continuation of Ser. No. 878,388, Feb. 16, 1978, abandoned.

[30] Foreign Application Priority Data

Mar. 4, 1977 [DE] Fed. Rep. of Germany ....... 2709427

[51] Int. Cl.³ .......................................... G03G 15/00
[52] U.S. Cl. .......................................... 355/11; 355/8
[58] Field of Search .......................... 355/8, 11, 51, 66

[56] References Cited

U.S. PATENT DOCUMENTS

| | | | |
|---|---|---|---|
| 3,833,296 | 9/1974 | Vola et al. | 355/51 |
| 3,957,368 | 5/1976 | Goshima et al. | 355/11 X |
| 4,012,142 | 3/1977 | Serikawa | 355/66 |
| 4,077,714 | 3/1978 | Komori et al. | 355/8 X |
| 4,080,064 | 3/1978 | Komori et al. | 355/11 X |

*Primary Examiner*—Richard L. Moses
*Attorney, Agent, or Firm*—Fitzpatrick, Cella, Harper & Scinto

[57] ABSTRACT

A copying apparatus functions as a copying apparatus for an original in a form of book and also as a copying apparatus for a sheet original. To this end, the copying apparatus includes a transporting device for a sheet type original and an original table for book type original. The copying apparatus also includes a switching mirror which can move from a first position to a second position. In the first position, the mirror is retracted outside of the optical path for copying the book type original. In the second position, it is interposed in the optical path and forms a new optical path for copying the sheet type original.

2 Claims, 1 Drawing Figure

DUAL MODE COPYING APPARATUS FOR COPYING THICK AND SHEET ORIGINALS

This is a continuation of application Ser. No. 878,388, filed Feb. 16, 1978, now abandoned.

BACKGROUND OF THE INVENTION

1. Field of the Invention

The present invention relates to a copying apparatus usable for copying independently an original in a form of a sheet, and also an original in a form of a book.

2. Description of the Prior Art

Apparatus for copying sheet type originals has such an advantage that a rapid and continuous copying process can be used since the originals are successively transported past an exposure scanning opening. On the contrary, apparatus for copying a book type original requires a longer time for copying. In the case of copying a book type original it is necessary to provide for scanning the original, a forward and backward moving scanning means which results in lost time for copying.

The copying apparatus over which the present invention constitutes an improvement is useful for continuously copying a set of originals, wherein an automatic original feeding mechanism is used to feed sheet originals successively into an original transporting apparatus, and in which a switching means is provided for switching over the copying process from the copying of book type original to that of sheet type original.

Such type of copying apparatus is disclosed in U.S. Pat. No. 3,833,296. As seen from that patent, the movable mirror provided at the side of the book type original is so designed that it moves outward, passing through one of two end positions, or so that it has a varied mirror angle. Therefore, after copying a book type original, the mirror can be used as a part of stationary mirror system for copying a sheet type original.

However, to make such type of copying apparatus there are required a particular control apparatus and adjustment techniques.

SUMMARY OF THE INVENTION

Accordingly, it is the principal object of the invention to provide a copying apparatus which enables an operator to change over the copying process from that for a book type original to that for a sheet type original and vice versa by means of relatively simple means.

To attain this and other objects according to the invention, there is proposed a copying apparatus as described in the claims.

According to a feature of the present invention, the scanning mirror is moved forward and backward in a known manner when a copying of a book type original is carried out. The switching mirror used in changing over the copying process is turned to a position in which the mirror surface lies out of the optical path determined for copying a book type original so as to open the optical path.

When a sheet type original is copied, the switching mirror is interposed in the optical path so as to shut off the path and instead form an optical path for carrying out a copying of a sheet type original. The switching mirror in this position reflects the beam of light reflected by a mirror disposed under the scanning opening. The beam reflected by the switching mirror is incident upon a rotary drum through the lens.

Other features and advantages of the invention will be apparent from the following description.

BRIEF DESCRIPTION OF THE DRAWING

In the drawing, the single FIGURE is a longitudinal cross-section of a copying apparatus showing an embodiment of the invention.

DESCRIPTION OF THE PREFERRED EMBODIMENTS

Figure 1:
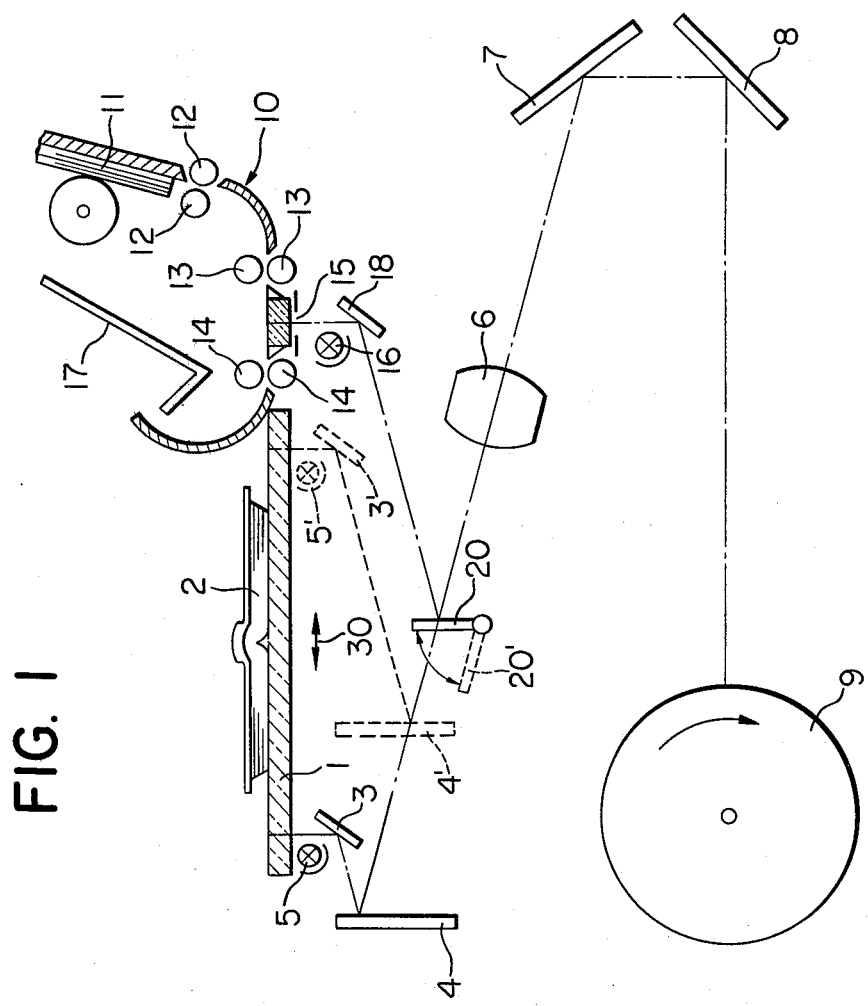

Referring to the single drawing, the reference numeral 1 designates a glass plate on which an original is laid. The original may be in a form of book or of single sheet, although there is shown in the drawing a book 2 on the glass plate 1 by way of example. The original 2 is scanned line by line with the aid of scanning mirrors 3 and 4 moving in the direction of the arrow 30. The mirrors 3 and 4 move from the starting position shown in the drawing up to the end position suggested by the phantom lines 3' and 4', and again return to the starting position. Together with these scanning mirrors, there is also an exposure apparatus 5 which is moved to illuminate the original 2. The two scanning mirrors 3 and 4 are moved at different speeds from each other. Therefore, in order to adjust the optical length between the original and the lens 6, the scanning mirror 3 is always moved over a distance longer than the distance moved, for example, by the scanning mirror 4.

The light transmitted through the lens 6 is directed to a rotary drum 9 through stationary mirrors 7 and 8. A sheet of photosensitive paper is laid on the drum 9 and secured on it by a suitable securing means disposed thereabout (not shown).

Next to the glass plate 1 there is provided a sheet feeding apparatus 10 in which an original in form of a single sheet is taken up from a set of original sheets 11 one by one and transported passing through a scanning opening 15 by pairs of transporting rollers 12, 13 and 14. The scanning opening is illuminated by a light source 16 behind which a mirror 18 is disposed. After passing through the scanning opening, the sheet original is received by a sheet receiving device 17.

Before the lens 6 there is disposed a mirror 20 which can turn about its axis so as to switch-over the copying process from that for a book type original to that for a sheet type original. Normally, the mirror 20 takes a position indicated by the dotted line 20' in which the beam of light reflected by the mirrors 3 and 4 is allowed to directly impinge upon the lens 6 for copying a book type original. When the switching mirror 20 is changed over to its second position (indicated by the solid line in the drawing) the beam of light, passed through the scanning opening 15 and reflected by the stationary mirror 18, is incident upon the switching mirror 20 which reflects it toward the lens 6 for copying a sheet type original. Thus, the image of the sheet type original is projected on the surface of the drum 9.

An important advantage of the invention is found in that using a relatively simple means and very few additional moving parts, the switching over of a copying process from that for a book type original to that for a sheet type original becomes possible.

We claim:

1. A copying apparatus comprising:
   means for transporting a sheet original past a sheet original exposure station;
   means providing a surface for supporting an original in the form of a book;

a photosensitive medium;
a lens for forming an image on said photosensitive medium;
a fixed mirror;
movable mirror means including first and second movable mirrors for scanning an original supported on said surface, wherein the scanned image of the original is reflected by said first and second mirrors, respectively, and is then directed through said lens to said photosensitive medium; and
switching mirror means movably mounted adjacent a first optical path extending from said original supporting surface to said photosensitive medium through said scanning mirror means and said lens, said switching mirror means being selectively movable to a first position outside of said first optical path when the original supported on said surface is to be scanned by said scanning mirror means, and movable into a second position in which it is interposed in said first optical path between said first movable mirror and said lens, wherein said switching mirror means, when moved to said second position, forms, irrespective of the position of said movable mirror means, a second optical path for directing an image reflected by said fixed mirror from said sheet original exposure station onto said photosensitive medium through said lens.

2. Copying apparatus as claimed in claim 1, wherein said switching mirror means is disposed adjacent the first optical path between said second movable mirror and said lens.

* * * * *